(12) United States Patent
Jordan et al.

(10) Patent No.: US 9,172,224 B2
(45) Date of Patent: Oct. 27, 2015

(54) WIRE OR ROPE PULLER

(71) Applicants: Michael C. Jordan, Knoxville, TN (US); David S. Jordan, Knoxville, TN (US)

(72) Inventors: Michael C. Jordan, Knoxville, TN (US); David S. Jordan, Knoxville, TN (US)

(73) Assignee: iTool Equipment Holding LLC, Knoxville, TN (US)

( * ) Notice: Subject to any disclaimer, the term of this patent is extended or adjusted under 35 U.S.C. 154(b) by 336 days.

(21) Appl. No.: 13/694,234

(22) Filed: Nov. 9, 2012

(65) Prior Publication Data

US 2014/0131645 A1 May 15, 2014

(51) Int. Cl.
*H02G 1/08* (2006.01)
*H02G 1/06* (2006.01)

(52) U.S. Cl.
CPC ............... *H02G 1/06* (2013.01); *H02G 1/085* (2013.01); *H02G 1/08* (2013.01)

(58) Field of Classification Search
CPC ............. H02G 9/10; H02G 1/08; H02G 1/06; H02G 1/083; H02G 1/085; H02G 1/086; B66F 1/36; B66F 1/7494
USPC .................. 254/134.3 R, 134.3 FT, 13.43 PA
See application file for complete search history.

(56) References Cited

U.S. PATENT DOCUMENTS

| | | | | |
|---|---|---|---|---|
| 3,224,733 A * | 12/1965 | Ensley | ................ | 254/134.3 FT |
| 4,456,225 A * | 6/1984 | Lucas | .................. | 254/134.3 FT |
| 7,216,848 B2 * | 5/2007 | Plummer | ............. | 254/134.3 FT |
| 7,661,655 B2 * | 2/2010 | Tjader | ........................... | 254/280 |
| 8,016,267 B2 * | 9/2011 | Jordan et al. | .......... | 254/134.3 FT |
| 8,434,741 B2 * | 5/2013 | Radle et al. | .......... | 254/134.3 FT |
| 2005/0051759 A1 * | 3/2005 | Plummer | ............ | 254/134.3 FT |
| 2007/0221896 A1 | 9/2007 | Jordan et al. | | |

* cited by examiner

*Primary Examiner* — Lee D Wilson
*Assistant Examiner* — Seahee Yoon
(74) *Attorney, Agent, or Firm* — Michael E. McKee (57) ABSTRACT

A puller device for pulling a wire or rope through a conduit includes first and second motor-driven capstans about which a wire or rope can be wound for wire or rope-pulling purposes and an elongated arm arrangement having an end which is positionable adjacent the conduit through which the wire or rope is to be pulled. The first elongated arm member is connected to the second arm member for movement about a pivot axis, and there are provided a plurality of rollers adjacent the pivot axis having surfaces along which the wire or rope bears against so that forces which are exerted adjacent the pivot axis by the wire or rope are distributed between the rollers. In addition, a conduit-engaging assembly mounted upon the elongated arm arrangement holds the conduit in a fixed positional relationship with respect to the elongated arm arrangement during a wire or rope-pulling operation.

25 Claims, 8 Drawing Sheets

WIRE OR ROPE PULLER

The benefit of Provisional Application Ser. No. 61/628,956, filed Nov. 10, 2011, and entitled DUAL CAPSTAN VARIABLE SPEED WIRE AND/OR ROPE PULLER WITH UNIVERSAL CONDUIT ADAPTER, is hereby claimed. The disclosure of this referenced provisional patent application is incorporated herein by reference.

BACKGROUND OF THE INVENTION

This invention relates generally to means and methods for pulling wire or rope through a conduit and relates, more particularly, to equipment used for carrying out such a task.

It is common at a construction jobsite that a wire or rope (e.g. one that is tied to an electrical wire) is desired to be pulled through an electrical conduit. For purposes of pulling such a wire or rope through the conduit, there exists equipment which includes a motor-driven capstan about which the wire or rope to be pulled can be wound, a series of arms which are joined in a end-to-end arrangement so that as the wire or rope being pulled from the conduit moves toward the capstan, the wire or rope is guided along the arrangement of arms. A free end of the arm arrangement is positioned against an end of the conduit, and the motor-driven capstan is actuated for pulling the wire or rope through and out of the conduit.

An example of a piece of equipment of the aforedescribed class is shown and described in U.S. Pat. No. 8,016,267 having the same named inventors as the instant application.

It would be desirable to provide a piece of equipment for pulling for wire or rope through a conduit which improves upon the equipment described in the referenced patent.

Accordingly, it is an object of the present invention to provide a new and improved wire or rope puller.

Another object of the present invention is to provide such a puller which is relatively lightweight, easy to manipulate and set up and which can be adapted for pulling wire or rope through a conduit having an end disposed at any of a number of locations, such as from a floor, wall or a ceiling.

Still another object of the present invention is to provide such a puller which is capable of pulling heavy loads at lower speed or lighter loads at higher speeds and which can be readily switched from a lighter load pull to a higher load pull or vice versa.

Yet another object of the present invention is to provide such a puller whose construction distributes forces which are exerted upon the puller in a manner which reduces the amount of load-pulling forces which would otherwise be required to pull the wire or rope along the path.

A further object of the present invention is to provide such a puller having a conduit-engaging assembly capable of being quickly adapted to any of a number of differently-sized conduits through which the wire or rope is desired to be pulled.

A still further object of the present invention is to provide such a puller which is uncomplicated in structure, yet effective in operation.

SUMMARY OF THE INVENTION

This invention resides in a puller device for pulling a wire or rope through a conduit. The device includes a frame and an elongated arm arrangement which is connected at one end to the frame and has an opposite end which is positionable adjacent the conduit through which the wire or rope is to be pulled and along which the wire or rope travels as it is pulled from the conduit.

In one aspect of the invention, the device includes first and second motor-driven capstans which are rotatably mounted upon the frame for rotation with respect thereto so that by winding the wire or rope about either the first or second capstan and actuating the motor-driven capstan about which the wire or rope is wound, the wire or rope is pulled through the conduit as the first or second capstan about which the wire or rope is wound is rotated relative to the frame.

In another aspect of the invention, the elongated arm arrangement includes first and second elongated arm members along which the wire or rope is permitted to travel during a wire or rope-pulling operation wherein the wire or rope travels along the second elongated arm member and then along the first elongated arm member as the wire or rope is pulled toward the capstan. In addition, the device includes means for means for connecting the first and second elongated arm members together for movement about a pivot axis, and the connecting means includes a plurality of rollers having surfaces along which the wire or rope bears against during a wire or rope-pulling operation so that forces which are exerted upon the connecting means by the wire or rope are distributed between the rollers.

In still another aspect of the invention, the device includes a conduit-engaging assembly mounted at the opposite end of the elongated arm arrangement for holding the conduit in a fixed relationship with respect to the elongated arm arrangement during a wire or rope-pulling operation wherein the conduit-engaging assembly includes a U-shaped bracket having an interior which is positionable about the conduit through which the wire or rope is to be pulled and hardware which provides an abutment surface against which the conduit is positionable so that when the conduit is held by the conduit-engaging assembly, the conduit is positioned between the abutment surface and the interior of the U-shaped bracket.

DETAILED DESCRIPTION OF AN ILLUSTRATIVE EMBODIMENT

Figure 1:
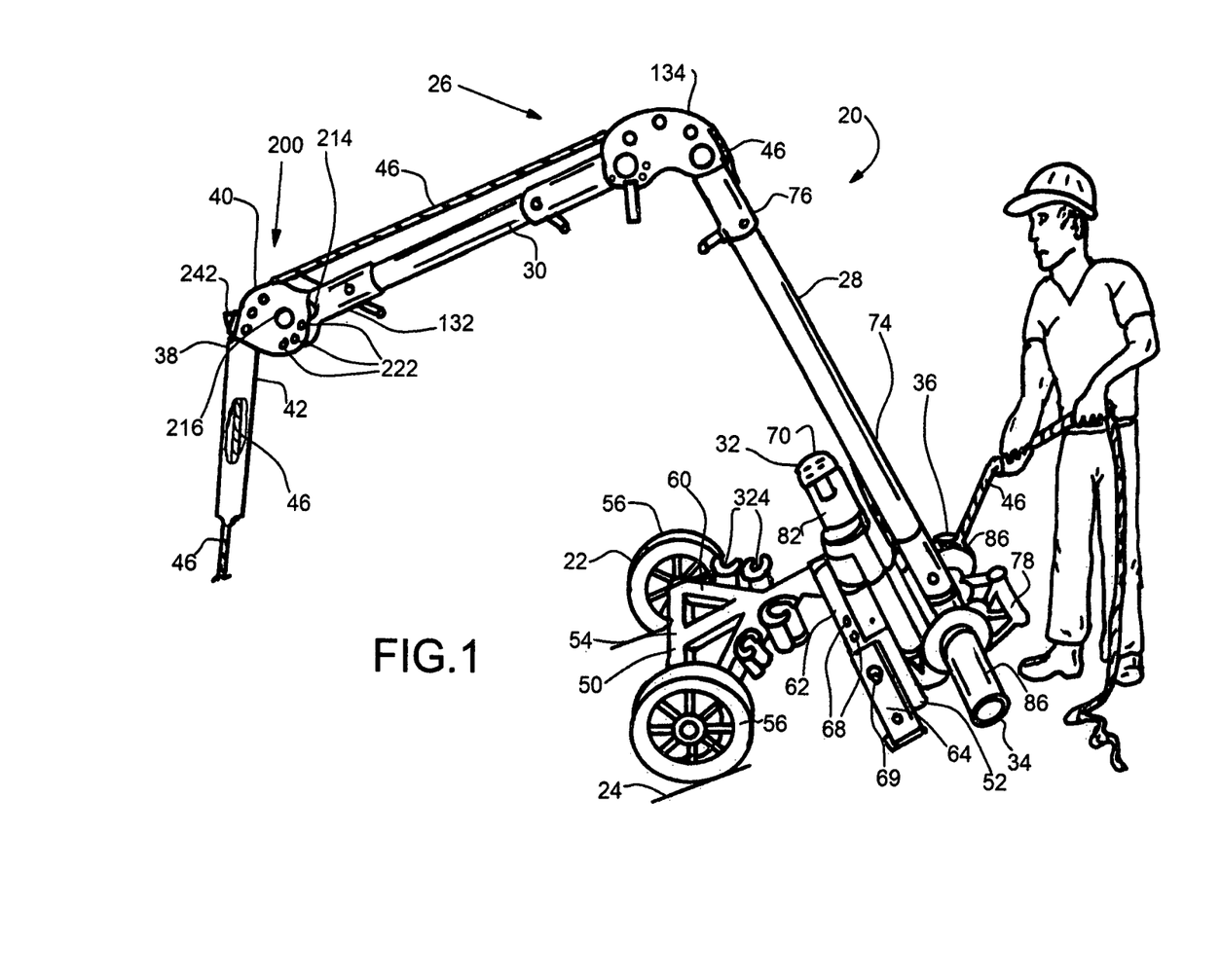
FIG. 1 is a perspective view of a wire or rope puller within which features of the invention are embodied and shown being used to pull a rope through a conduit wherein the conduit is shown partly cut-away.
Figure 2:
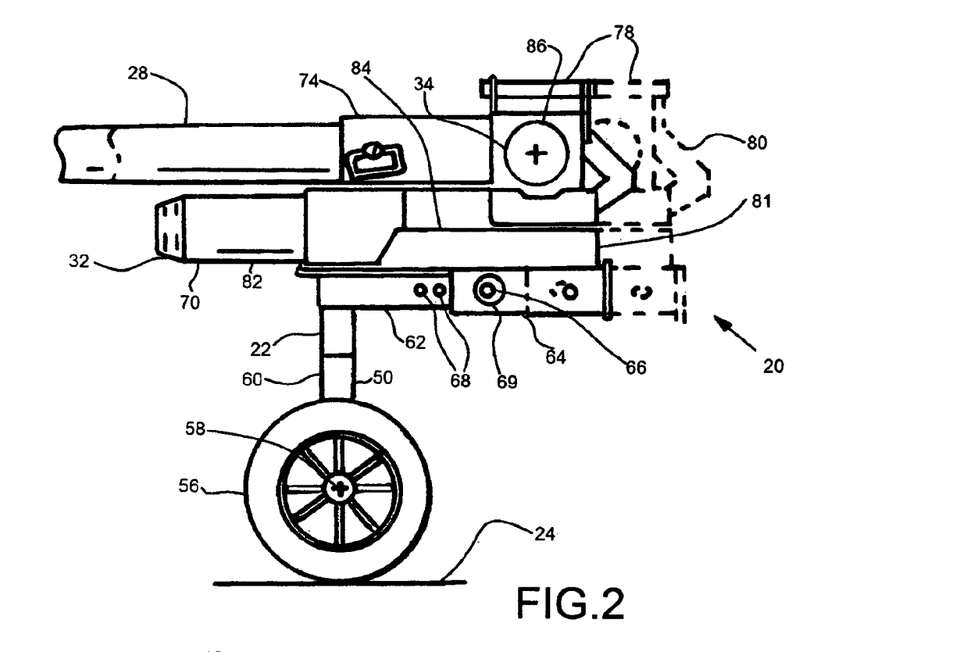
FIG. 2 is a side elevation view of a fragment of the FIG. 1 puller as viewed generally from the right in FIG. 1 and showing a portion of the puller in an alternative positional relationship with respect to the underlying floor.
Figure 3:
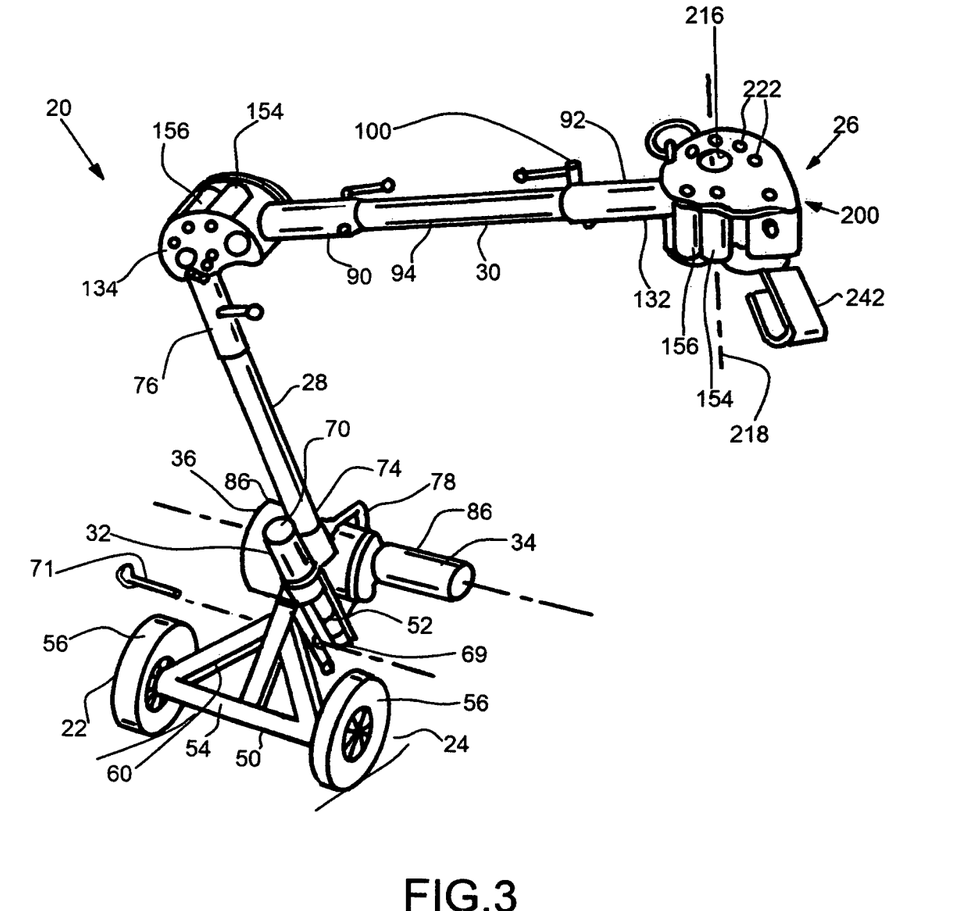
FIG. 3 is a view of a perspective view of FIG. 1 puller, shown from an alternative angle and showing one of its elongated arm members in an alternative positional relationship with respect to the underlying floor and wherein the U-shaped bracket of the conduit-engaging assembly of the puller is shown removed from the remainder thereof.

Turning now to the drawings in greater detail and considering first FIGS. 1-3, there is illustrated an embodiment, generally indicated 20, of a wire and rope puller within which features of the present invention are embodied. The puller 20 includes a wheeled base 22 with which the puller 20 can be rolled across an underlying floor 24 and an arm arrangement, generally indicated 26, comprising a pair of elongated arm members 28 and 30 which are connected together in an end-to-end manner described herein and which are supported by the wheeled base 22 for movement therewith. A variable-speed electric drive motor 32 is also mounted upon the base 22 and connected in driving relationship with a pair of capstans 34 and 36 disposed on opposite sides of the base 22.

As illustrated in FIG. 1 and by positioning a free end, indicated 40, of the arm arrangement 26 adjacent the end, indicated 38, of a conduit 42 through which a length 46 of wire or rope is desired to be pulled, wrapping a segment of the length 46 of wire or rope about one of the two capstans 34 or 36, and then actuating the motor 32, the length 46 of wire or rope is pulled through the conduit end 38 and toward the capstan 34 or 36 as the capstan 34 or 36 is rotated by the motor 32.

With reference again to FIGS. 1-3, the wheeled base 22 includes a lower frame portion 50 and an upper frame portion 52 which is connected to the lower frame portion 50 in a manner (described herein) which accommodates an adjustment in the positional relationship between the frame portions 50 and 52 and consequently the position of the center of gravity, or balance point, of the puller 20 about the wheeled base 22. The lower frame portion 50 includes an elongated axle portion 54, and two wheels 56 are mounted on the opposite ends of the axle portion 54 for rotation about a common rotational axis 58 which extends along the longitudinal axis of the axle portion 54. As will be apparent herein, it is this rotational axis 58 which provides a pivot axis about which the base 22 can be pivoted relative to the wheels 56 or, more specifically, relative to the underlying floor 24 for use of the puller 20.

The lower frame portion 50 further includes a plurality of braces 60 which are supported atop the axle portion 54 and a first tubular member 62 which is supported atop the braces 60 so as to be spaced from the axle portion 54 and oriented substantially along a path which is normal to the rotational axis 58 of the axle portion 54 (or, more specifically, perpendicular to a plane which contains the longitudinal axis of the axle portion 54). A plurality of through-openings 68 are provided along the length of the first tubular member 62 for a reason which will be apparent herein.

The upper frame portion 52 includes a second tubular member 64 which is positioned about so as to accommodate a sliding movement of the second tubular member 64 along the length of the first tubular member 62, and there is provided within the second tubular member 64 a through-opening 66 which can be selectively aligned with one of the through-openings 68 of the first tubular member 62.

Associated along the through-opening 66 is a threaded boss 69 for threadably accepting the shank of a pin 71 (FIG. 3) which can be directed through a selected one of the through-openings 68 which is aligned with the through-opening 66. It follows that with the pin 71 withdrawn from the through-opening 68, the upper frame portion 52 can be shifted in position with respect to the lower frame portion 50 by slidably moving the second tubular member 64 along the first tubular member 62 to align an alternative trough-opening 68 with the through-opening 66. By way of example, there is illustrated in FIG. 2 a view of the upper and lower frame portions 52, 50 being positioned in alternative positional relationships as the upper frame portion 52 is moved rightwardly along the first tubular member 62 from a position shown in solid lines in FIG. 2 to a position shown in phantom in FIG. 2. By thereafter re-securing the pin 71 through the aligned through-openings 66 and 68 (by threading the pin 71 within the boss 69), the upper frame portion 52 is secured to the lower frame portion 50 in an alternative positional relationship with respect thereto.

Because the upper frame portion 52 can be shifted relative to the lower frame portion 50 as aforesaid, the weight distribution of the puller 20 about the wheels 56 can be adjusted to, for example, render it easier for a user to manually move the puller 20 across the floor from one site to another. If desired, a hitch mechanism (not shown) can be incorporated within one end (i.e. the rightward end as shown in FIG. 2) of the second tubular member 64 to accommodate the attachment of the puller 20 to a bumper hitch of a vehicle for movement of the puller 20 from one site to another. Further still, the second tubular member 64 can be slid completely off of an end of the first tubular member 64 to completely remove the upper frame portion 52 from the lower frame portion 50 if it is desired to, for example, disassemble the puller 20 for transport or to position the upper frame portion 52 closely adjacent the underlying floor 24 for pulling a wire or rope from a conduit disposed close to the floor 24.

Fixedly secured atop the second tubular member 54 is a motor assembly 70, which includes the electric drive motor 32 introduced earlier, and the first elongated arm member 28, also introduced earlier. The first elongated arm member 28 includes a proximal end 74 (which is fixedly disposed adjacent the motor assembly 70) and an opposite distal end 76. Extending from opposite sides of the motor assembly 70 is one capstan 36 (having a diameter of about nine inches) and the other capstan 34 having a smaller diameter (e.g. about four inches) than the first capstan 36. Preferably, each capstan 36 or 34 is provided with a cylindrical surface 86 about which a segment of the length 46 of wire or rope is wrapped for a pulling operation with the puller 20 and which possesses a high-friction surface or, more specifically, a surface 86 which possesses relatively high degree of resistance to movement between the surface 86 and the length 46 of wire or rope wrapped thereabout.

With reference still to FIG. 2, the motor assembly 70 includes a gearbox 81 disposed between the first and second capstans 36 and 34 and the drive motor 32 for drivingly joining the rotatable shaft of the motor 32 to each capstan 36 or 34 so that the actuation of the drive motor 32 effects the rotation of both capstans 36 and 34 simultaneously. The motor 32 has an outer housing 82 which is fixedly attached atop a platform section 84 which is, in turn, supported upon the second tubular member 64 so that as the positional relationship of the second tubular member 54 is adjusted relative to the first tubular member 52, so is the entirety of the upper frame portion 52—along with the motor 32, capstans 36 and 34 and the first elongated arm member 28. To facilitate the manual handling of the puller 20 between alternative job sites, the puller 20 includes two sets of handles 78, 80 which are mounted to the top and to the rear, respectively, of the motor assembly 70.

Figure 4:
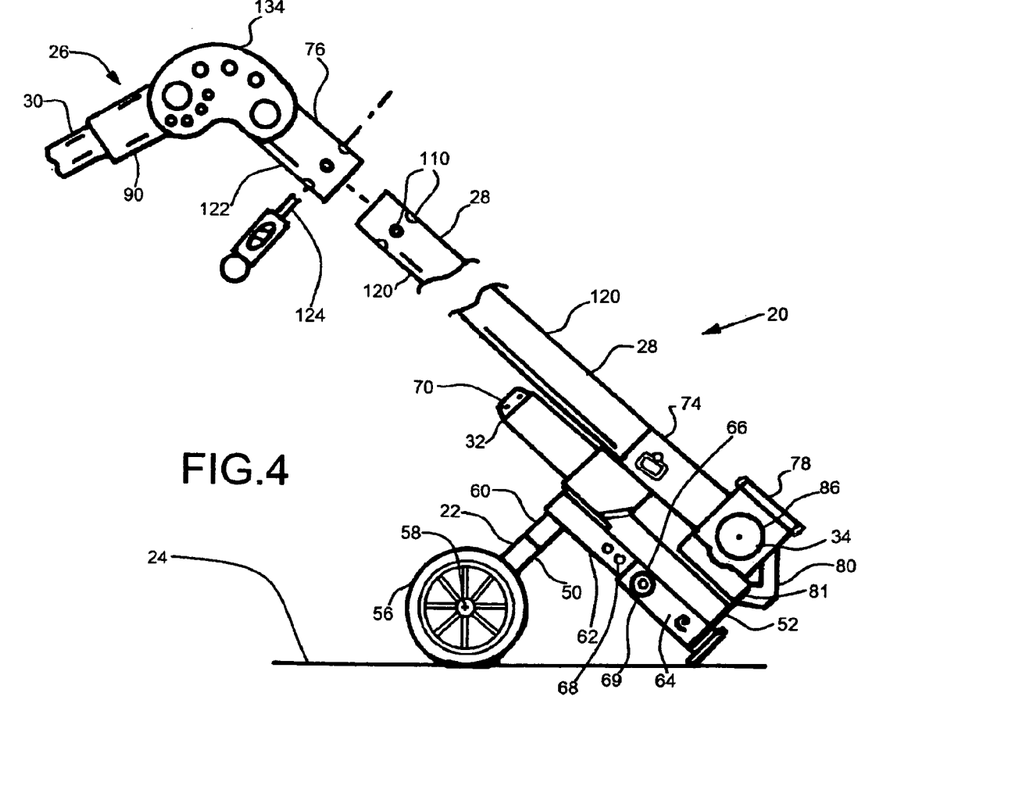
FIG. 4 is a side elevation view of another fragment of the FIG. 1 puller, shown exploded.
Figure 5:
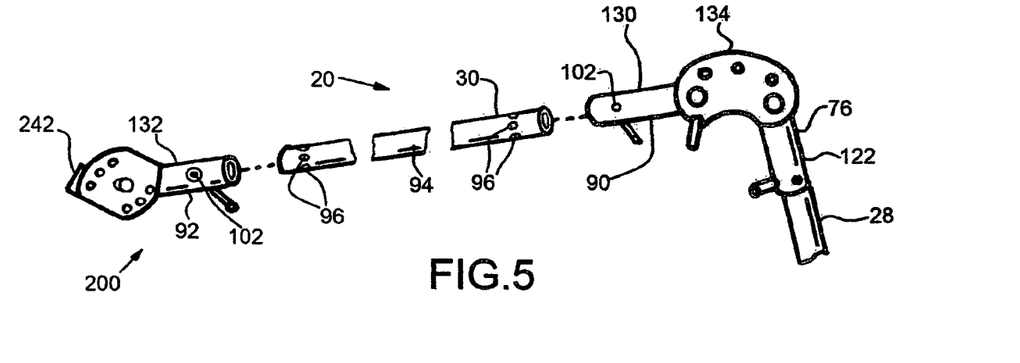
FIG. 5 is a perspective view of one of the elongated arm members of the FIG. 1 puller, shown exploded.

With reference to FIGS. 1 and 4, the first elongated arm member 28 is arranged so that its longitudinal axis is substantially parallel to that of the first tubular member 62. In addition, the first elongated arm member 28 includes a first tube portion 120 which includes the proximal end portion 74 of the first arm member 28 and a second tube portion 122 which includes the distal end 76 of the first arm member 28 and which is slidably positioned about the first tube portion 120. The first tube portion 120 includes a plurality of openings 110 thereabout, and the second tube portion 122 is provided which a spring-biased pin 124 on one side thereof whose end is adapted to be accepted by any of the openings 110 provided about the first tube portion 120 (and whose housing is attached, as with welds, to the outer surface of the second tube portion 122) to thereby permit the angular orientation of the second arm member 30 to be adjusted relative to the floor 24 (between, for example, the position illustrated in FIG. 1 and the position illustrated in FIG. 2) by withdrawing the pin 124 from the first tube portion 120, rotating the second tube portion 122 about the first tube portion 120 to align the pin 124 which an alternative opening 110 provided in the first tube portion 120, and then releasing the pin 124 to re-secure the second tube portion 122 in its alternative position about the first tube portion 120.

With reference to FIGS. 1 and 5-7, the second elongated arm member 30 includes a proximal end portion 130 (disposed adjacent the distal end portion 76 of the first elongated arm member 28) and a distal end portion 132. In addition, the second elongated arm member 30 includes a pair of tube portions 90 and 92 at the proximal and distal ends 74 and 76, respectively, and which open toward one another. Moreover, the second elongated arm member 30 further includes an intermediate tube portion 94 (which has a slightly smaller diameter than that of the tube portions 90 and 92) so that each of the opposite ends of the intermediate tube portion 94 can be closely accepted by the open end of the tube portion 90 or 92. The end portion of the intermediate tube portion 94 which is disposed within the tube section 92 is provided with several pairs of through-openings 96 thereabout, and the tube section 92 is provided with a pair of through-openings 98 which can be aligned with any of a pair of through-openings 96 of the intermediate tube portion 94 and secured thereto with a pin 100.

Figures 6, 7:
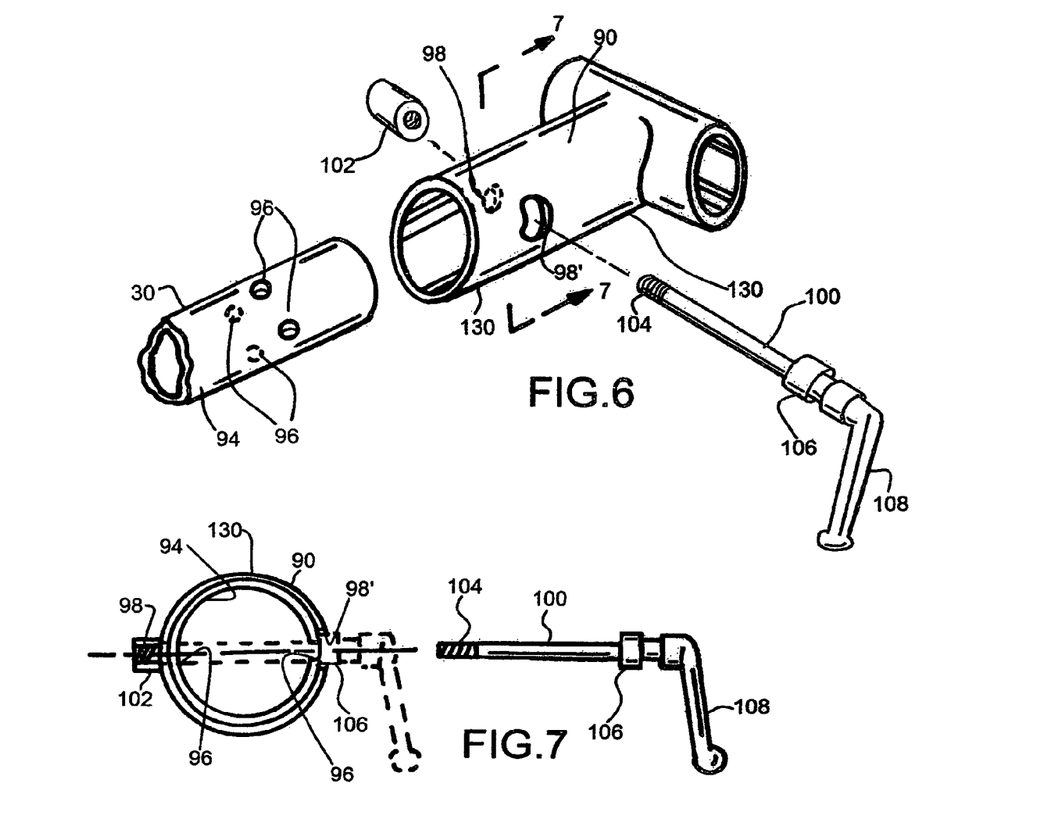
FIG. 6 is a perspective view of a fragment of the elongated arm member of FIG. 5, shown from an alternative angle and shown exploded.
FIG. 7 is a cross-sectional view taken along lines 7-7 of FIG. 6.

In connection with the foregoing and as exemplified by the proximal end portion 130 depicted in FIGS. 6 and 7, each of the tube portions 90 and 92 is provided with an internally-threaded boss 102 attached to a side of the tube portion 90 or 92 so as to attend one of the through-openings 98, and the pin 100 is provided with a threaded end portion 104 which can be inserted through the aligned through-openings 98 and 96 and be threadably secured within the boss 102. Furthermore, one opening, indicated 98' of the tube portion 92 is enlarged in diameter, and the pin 100 includes a shoulder portion 106 adjacent the end thereof opposite the threaded end 104 thereof which is permitted to pass completely through the opening 98 and abut the surface of the intermediate tube portion 94. Therefore and as the pin 100 is tightened within the threaded boss 102 (by rotating the grip portion 108 of the pin 100), the shoulder portion 106 of the pin 100 urges the intermediate tube portion 94 against an interior surface of the tube portion 90 or 92 to firmly hold the intermediate tube portion 94 against the tube portion 90 or 92.

It will be understood that the series of pairs of through-openings 96 disposed about the intermediate tube portion 94 permits a user to select the angular disposition of the second arm member 30 relative to the floor 24 by removing the pin 100 from the tube portion 92, rotating the second arm member 30 (by way of the tube portion 92) about the longitudinal axis of the intermediate tube portion 94 to align the through-openings 98 with an alternative pair of openings 96, and then re-securing the pin 100 through the alternative pair of aligned openings 96 and 98.

It also follows from the foregoing that the intermediate tube portion 94 can be exchanged with a tube portion of alternative length to thereby alter the length of the second elongated arm member 30. Furthermore and although the intermediate tube portion 94 of the depicted puller 120 has been shown and described as having a fixed length, a telescoping tube arrangement can be incorporated within the first elongated arm member 30 to facilitate an adjustment of the length thereof.

With reference to FIGS. 1 and 8-10, it is a feature of the puller 20 that the first and second elongated arm members 28 and 30 are pivotally connected together (e.g. at a corner) by way of an intermediate knuckle assembly 134 which provides a substantially arcuate path of relatively large diameter and reduced resistance along which the length 46 of wire or rope is guided as the length 46 is pulled from the conduit end 38 and moves across the knuckle assembly 134 (and thus about the corner formed by the joinder of the first and second arm members 28 and 30).

Figure 8:
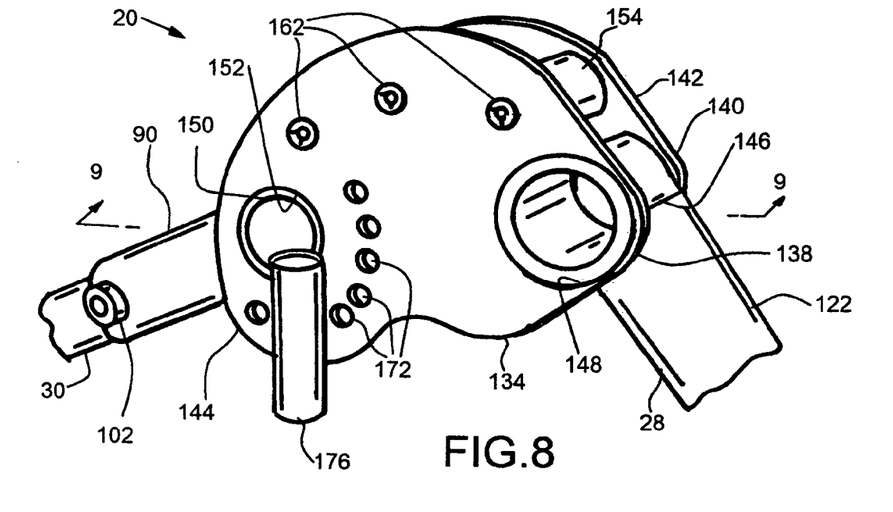
FIG. 8 is a perspective view of a knuckle assembly of the puller of FIG. 1.
Figure 9:
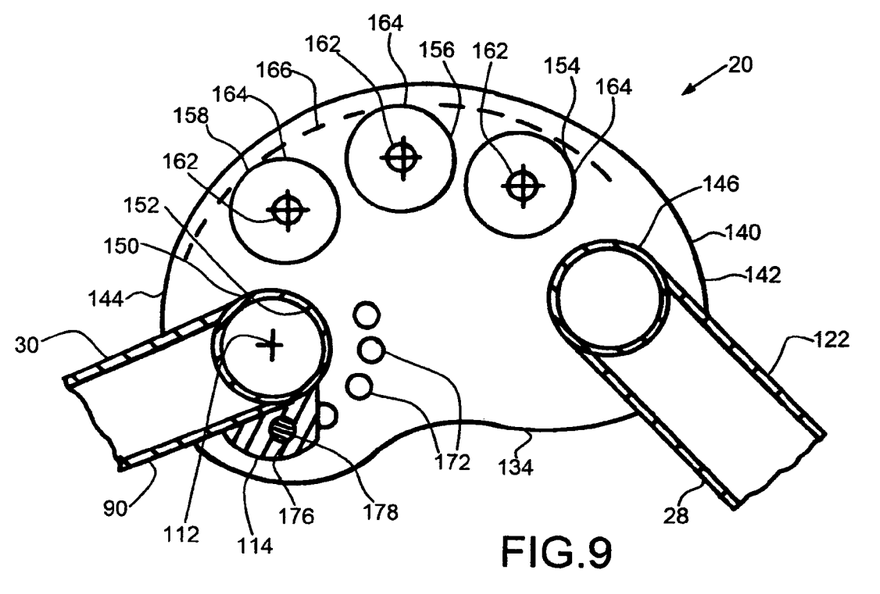
FIG. 9 is a cross-sectional view taken along lines 9-9 of FIG. 8.
Figure 10:
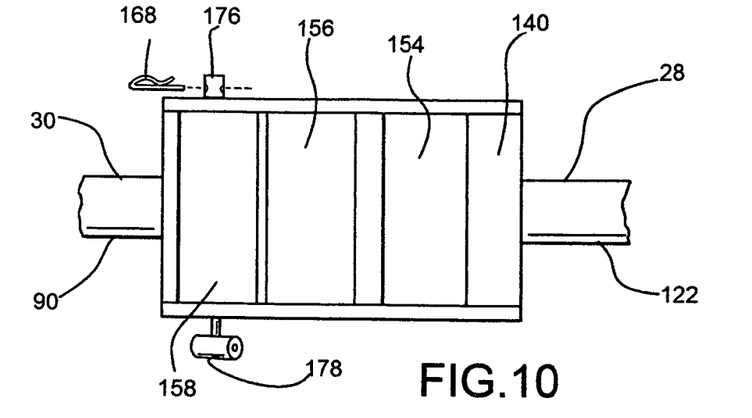
FIG. 10 is a view of the knuckle assembly of FIG. 8 as viewed from above in FIG. 11.

The intermediate knuckle assembly 134 of the depicted puller 20 includes a pair of kidney-shaped plates 138 and 140 having two opposite ends 142 and 144 and which are secured in spaced-apart and parallel relationship with one another. To this end, a transversely-extending tube section 146 is fixedly secured, as with welds, across an end of the second tube portion 122 of the first arm member 28, and the opposite ends of the tube section 146 is fixedly secured within pre-formed openings 148 provided in the ends 142 of the plates 138, 140. Furthermore, a transversely-extending tube section 150 is fixedly secured, as with welds, across an end of the first tube portion 90 of the second elongated arm member 30, and the opposite ends of the tube section 150 are, in turn, rotatably mounted within pre-formed openings 152 provided in the ends 144 of the plates 138 and 140. With the plates 138 and 140 attached to the first and second elongated arm members 28 and 30 in this manner, the second arm member 30 is permitted to be pivoted relative to the knuckle assembly 134 (and the first arm member 28) about the longitudinal axis, indicated 112, of the tube section 150 and which axis 112 extends to one side of the longitudinal axis of the first arm elongated member 28.

To releasably secure the second elongated arm member 30 in an alternative angular orientation with respect to the knuckle assembly 134, the pair of plates 138 and 140 are provided with a series of aligned through-openings 172 which are arranged about the pivot axis 112, and an apertured boss 114 is fixedly secured to the tube portion 90 for movement therewith. The second arm member 30 can be pivoted about the pivot axis 110 so that the aperture of the boss 114 can be aligned with an alternative pair of openings 172, and a retractable pin 176 whose shank 178 (FIG. 9) can be directed through the aligned through-openings 172 and the aperture of the boss 114 to thereby releasably secure the second arm member in the desired positional relationship between the arm member 30 and the plates 138, 140. The pin 176 can, in turn, be secured through the aligned openings as aforedescribed with a cotter pin 168 (FIG. 10).

In addition, the knuckle assembly 102 includes a plurality of (e.g. three) rollers and 154, 156 158 which are mounted for rotation between the plates 138 and 140. More specifically, each roller 154, 156 and 158 has a centrally-disposed shank 162 whose ends are supported by the plates 138, 140 and about which the roller 154, 156 and 158 is adapted to rotate, and the rotational axis of each roller 154, 156 and 158 is substantially parallel to the rotational axis of every other roller 154, 156 or 158. Moreover, each roller 154, 156 and 158 includes a cylindrical body 162 comprised of a relatively hard plastic material which provides a smooth cylindrical surface 164 across which a wire or rope being pulled from the conduit 42 is permitted to travel across.

It is a feature of the puller 20 that the rollers 154, 156 and 158 are arranged in such a relationship to one another and to the first and second arm members 28 and 30 so that the cylindrical surfaces 164 of the rollers 154, 156 and 158 collectively provide a substantially arcuate path, indicated 166 in FIG. 9, of relatively large radius (e.g. about ten inches) along which the wire or rope being pulled from the conduit 42 travels across as it moves first along the second elongated arm member 30 and then along the first elongated arm member 30. In other words, the rollers 154, 156 and 158 are mounted at the corner formed by the joinder between the first and second elongated arm members 28 and 30, and the rollers 154, 156 and 158 provide a substantially arcuate guideway for the wire or rope to move about this corner. Inasmuch as the forces which are exerted by a wire or rope against the rollers 154, 156 and 158 during a pulling operation can be relatively large, this force is distributed across the shanks 168 of the plurality of rollers 154, 156 and 158.

When the aforedescribed arrangement of multiple rollers 154, 156 and 158 within the knuckle assembly 134 are compared to an arrangement including a single roller used to guide a wire or roller around a corner, the shank of the single roller would have to withstand the entirety of any load-induced forces applied thereto and still be capable of rotating as a wire or rope is pulled thereacross. However, the arrangement of multiple rollers in the knuckle assembly 134 distributes the load-induced forces across the shanks of the multiple rollers so that the rollers 154, 156 and 158 rotate with more ease (i.e. less rolling resistance) as a wire or roller is pulled thereacross than would be the case with the single roller arrangement, and is advantageous in this respect.

Figure 12:
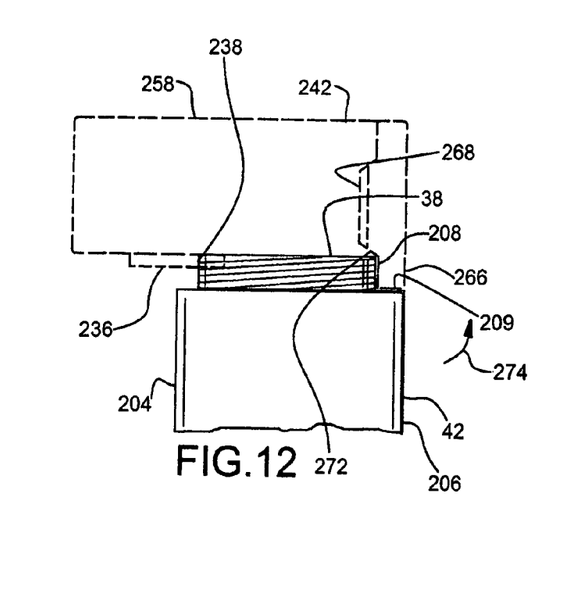
FIG. 12 is a side elevation view of an exemplary conduit which can be engaged with the conduit-engaging assembly of FIG. 11.
Figure 13:
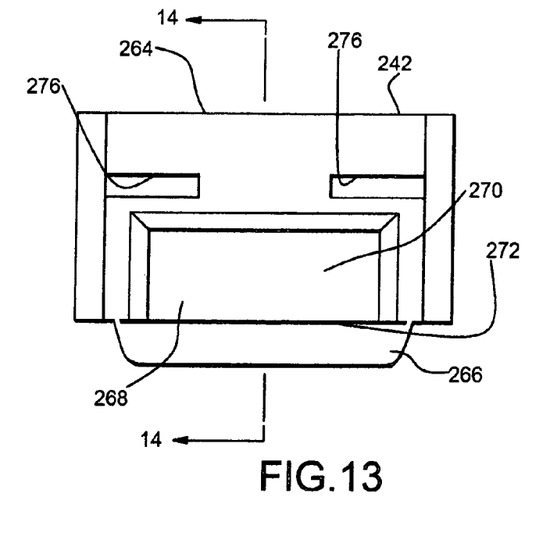
FIG. 13 is a rear view of the U-shaped bracket of the conduit-engaging assembly of FIG. 11, as seen generally from the left in FIG. 12.
Figure 14:
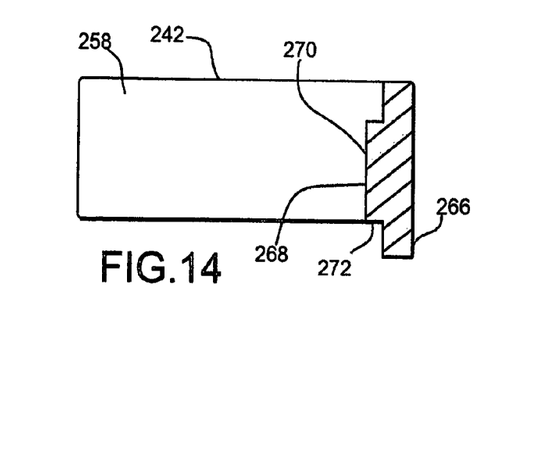
FIG. 14 is a cross-sectional view taken along lines 14-14 of FIG. 13.
Figure 15:
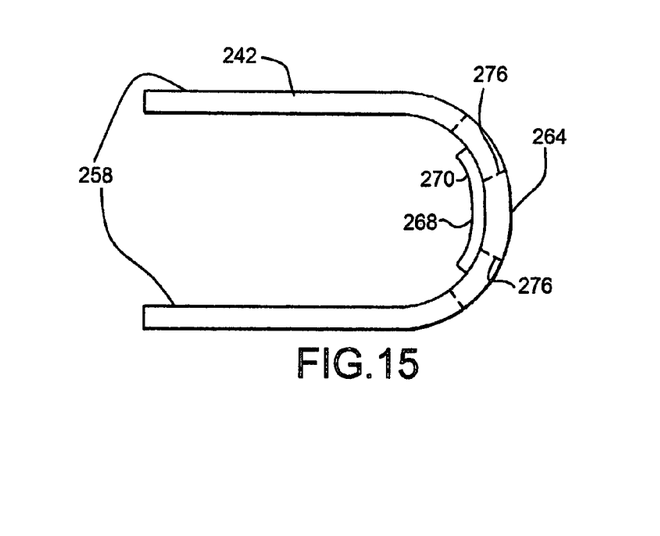
FIG. 15 is a top view of the U-shaped bracket of the FIG. 11 conduit-engaging assembly as viewed from above in FIG. 12.

With reference to FIGS. 1, 2 and 12-18, there is attached to the distal end portion 132 of the second elongated arm member 30 a conduit-engaging assembly, generally indicated 200, including a U-shaped bracket 242 which is securable about the outer surface of the conduit 42. In connection with the foregoing, there is illustrated in FIG. 12 an end portion, indicated 204, of a conduit 42 of a common class of conduits through which a wire or rope is desired to be pulled with the puller 20. In particular, the conduit 42 has a cylindrical outer surface 206 which terminates in a cylindrical (e.g. threaded) portion 208 of reduced diameter, and this cylindrical portion 208 is provided with a shoulder 209. The cylindrical end portion 208, in turn, terminates at the conduit end 38 (i.e. at the end of the reduced portion 208 opposite the shoulder 209). Meanwhile, the interior surface, indicated 211 in FIG. 17, of the conduit 42 is relatively smooth and possesses a constant diameter as a path is traced inwardly along the conduit 42 from the end 38 thereof. As will be apparent herein, the design of the conduit-engaging assembly 200 takes into account the aforedescribed characteristics of the conduit 42.

With reference again to FIG. 11, the conduit-engaging assembly 200 includes a pair of parallel plates 210, 212 which are pivotally mounted upon the distal end portion 132 of the second elongated arm member 30 by way of a tube section 214 (FIG. 1) which is fixedly secured to the distal end portion 132 of the second arm member 30 and whose ends extend through preformed openings 216 provided in the plates 210, 212 to accommodate a pivoting of the plates 210, 212 relative to the tube section 214 about a pivot axis 218. The pair of plates 210, 212 are arranged in a parallel, spaced-apart relationship and each includes a series of pairs of through-openings 222 provided along an arcuate path about the pivot axis 218. For purposes of securing the conduit-engaging assembly 200 in an alternative angular relationship with respect to the second arm member 30 (in a manner identical to the manner in which the knuckle assembly 134 can be adjusted with respect to the second arm member 30), there is secured to the tube section 214 of the second arm member 30 an apertured boss so that by pivoting the plates 210, 212 about the pivot axis 218, alternative pairs of through-openings 222 can be aligned with the aperture of this apertured boss. A removable pin 226 (FIG. 11) can be directed through the aligned through-openings 222 and the aperture of the boss to releasably secure the conduit-engaging assembly 200 in a desired positional relationship with the second arm member 30.

Figure 11:
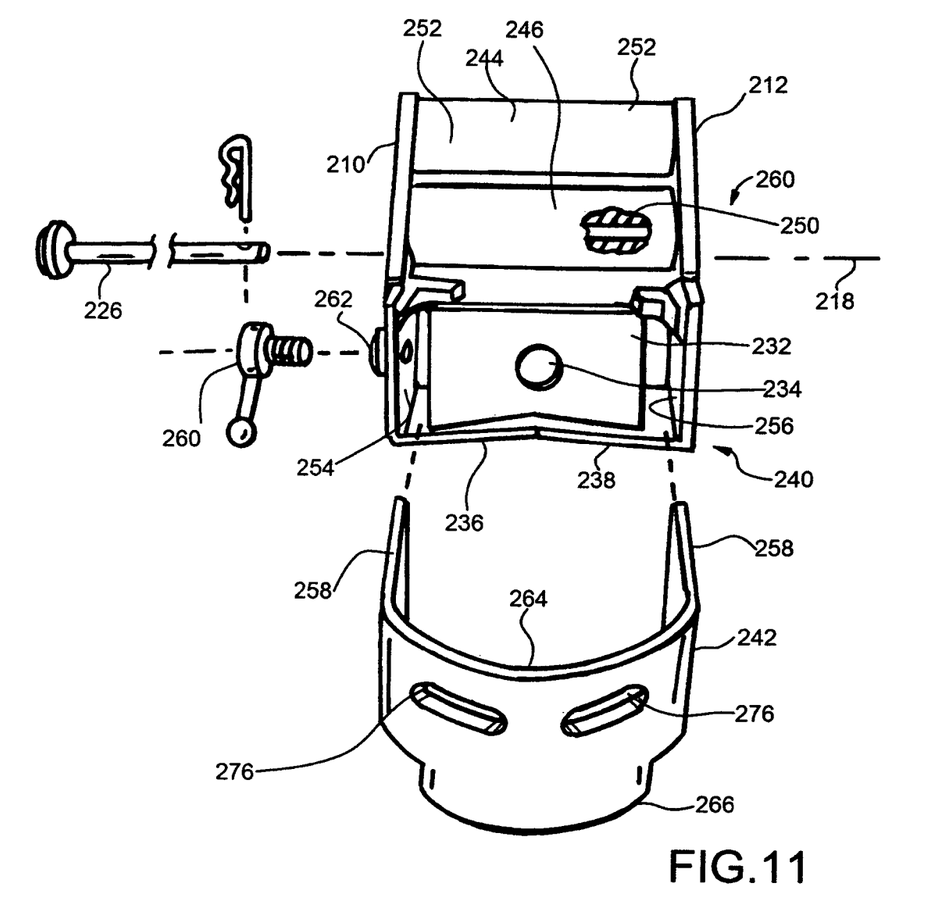
FIG. 11 is a frontal perspective view of the conduit-engaging assembly of the FIG. 1 puller, shown with its U-shaped bracket removed therefrom.

As best shown in FIG. 11, the conduit-engaging assembly 200 also includes hardware, generally indicated 240, which is fixedly secured within, as with welds, between the plates 210, 212 which is adapted to accept the U-shaped bracket 242 in a manner described herein and further includes a plurality of (i.e. two) rollers 244, 246 which are positioned between the plates 210, 212 for rotational movement with respect thereto. As are the rollers 154, 156 and 158 of the knuckle assembly 14 of FIGS. 8-10, each roller 244 or 246 of the conduit-engaging assembly 200 includes a shank 250 which extends through the center of the roller 244, 246 and a cylindrical body 252 comprised of a relatively hard plastic material. Collectively, the rollers 244, 246 provide an arcuate path of relatively large diameter (e.g. about ten inches) about which a wire or rope is guided as the wire or rope travels from the U-shaped bracket 242 (within which the conduit end 38 is clamped) and then along the second elongated arm member 64.

With reference still to FIG. 11, the hardware 240 provides a pair of slots 254, 256 disposed adjacent the inwardly-facing surfaces of the plates 210, 212 for accepting the legs, indicated 258, of the U-shaped bracket 242. In addition, the hardware 240 includes a face plate 232 having a center hole 234 provided therein and further includes a jaw plate 236 having a V-shaped edge 238 for engaging one side of the cylindrical (i.e. reduced) portion 208 of the conduit 42 when the conduit 42 is clamped within the conduit-engaging assembly 200. In other words, the V-shaped edge 238 is intended to provide an abutment surface against which one side of the conduit 42 is positionable.

As best shown in FIG. 11, the slots 254, 256 provided by the hardware 240 are disposed between the plates 210, 212 (at the end of the plates 210, 212 opposite the tube section 214) so as to slidably accept the legs 258 of the U-shaped bracket 242 directed endwise therein. Upon directing the legs 258 of the bracket 242 into the slots 254, 256 and then tightening a set screw 260 into an internally-threaded opening 262 provided in the plate 210 so that the shank of the set screw 260 squeezes one leg 258 of the bracket 242 against the opposite side of the slot 254, the bracket 242 is fixedly secured in place within the remainder of the conduit-engaging assembly 200.

With reference still to FIGS. 11-15, the legs 258 of the bracket 242 are joined together by way of a curved base section 264 which includes a downwardly-extending (as viewed in FIGS. 11-14) lip 266 and a protuberance 268 along the interior surface of the base section 264 which provides the base section 264 with a region 270 of increased thickness and a lower edge 272. When the bracket 242 is used to cooperatively engage the conduit 42 (for clamping purposes) and as best shown in FIG. 12, the interior surface of the base section 264 accepts the cylindrical portion 208 of the conduit 42, and the lower edge 272 of the region of increased thickness engages the conduit end 38. To clamp the conduit 42 within the bracket 242, the conduit 42 is positioned within the interior of the bracket 242 in the aforedescribed manner and the bracket legs 258 are then directed into the slots 254, 256 until the cylindrical portion 208 of the conduit 42 abuts (and is thereby accepted by the V-shaped edge 238 of the jaw plate 236). By subsequently tightening the set screw 260 within the internally-threaded opening 262 of the plate 210, the conduit 42 is firmly clamped in a fixed positional relationship with respect to the conduit-engaging assembly 200.

The base section 264 of the bracket 242 is also provided with a pair of spaced (and laterally-extending) slots 276 disposed directly above the region 270 of increased thickness for a purpose which will be apparent herein.

The forces required to pull a wire or rope through the conduit end 38 with the puller 20 can be large enough to urge the conduit 42 to torque, or pivot, about the conduit-engaging assembly 200 in the direction of the FIG. 12 arrow 274 as the segment of the wire or rope being pulled out of the conduit end 38 seeks axial alignment with the segment of the wire or rope which travels along the second arm member 30. However, the clamped condition of the conduit 42—with the lip portion 266 of the bracket 242 engaging the cylindrical portion 208 of the conduit 42 along the length thereof (and along the side thereof opposite the V-shaped edge 238) and the lower edge of the lip portion 266 abuts the shoulder 209 of the conduit 42—has been found to stably oppose the aforedescribed torquing of the conduit 42 in most wire or rope-pulling applications.

Although the aforedescribed conduit-engaging assembly 200—with only the bracket 242 clamped about the conduit 242—has proved to be well-suited for stably holding a conduit possessing a broad range of diameters for a relatively broad range of loads, it may be desirable—in wire or rope-pulling applications which are likely to require extremely high load-pulling efforts—to utilize an additional adaptor to further stabilize the conduit 42 clamped within the conduit-engaging assembly 200.

Figure 16:
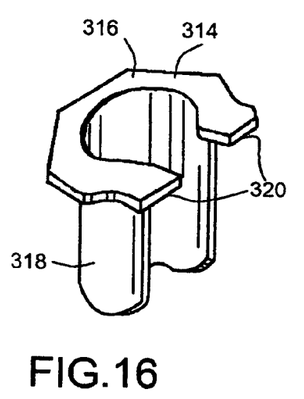
FIG. 16 is a perspective view of an adaptor which is usable with the conduit-engaging assembly like that of FIG. 11.
Figure 17:
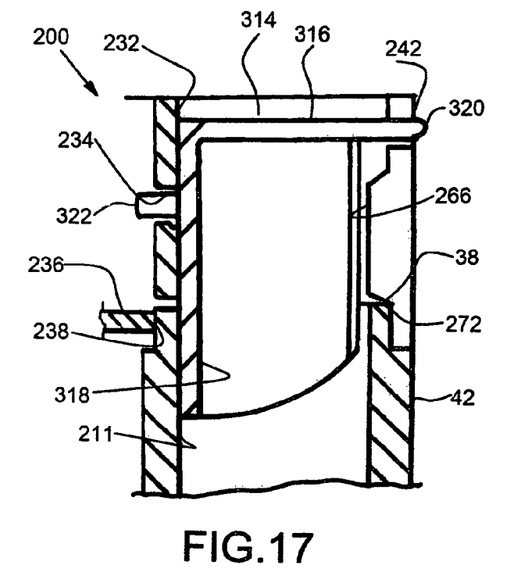
FIG. 17 is a longitudinal cross-sectional view of the FIG. 16 adaptor and the conduit-engaging assembly of FIG. 11 shown being used to hold a conduit through which a wire or rope is desired to be pulled.
Figure 18:
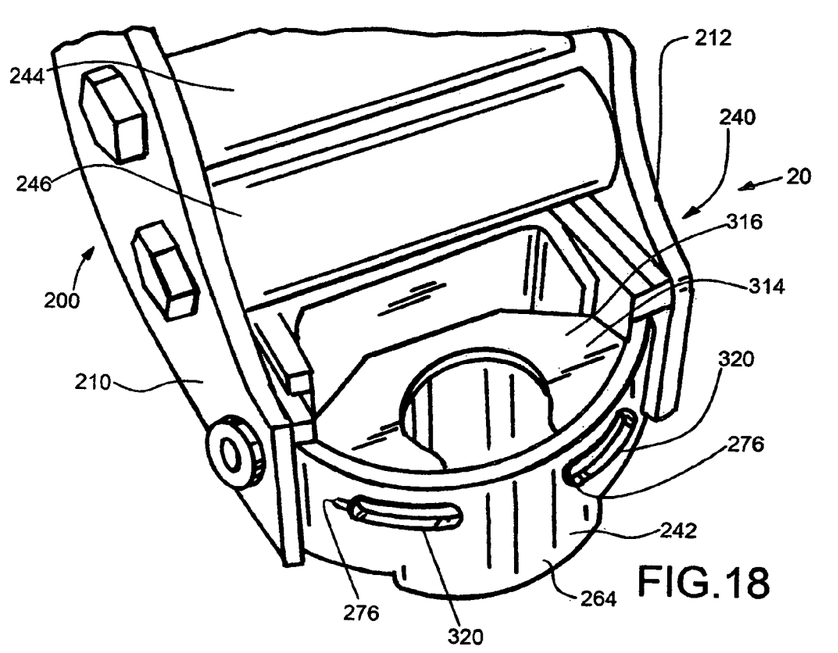
FIG. 18 is a perspective view of a fragment of the conduit-engaging assembly of FIG. 11 and the adaptor of FIG. 17 shown being positioned within the conduit-engaging assembly for use.

In connection with the foregoing and with reference to FIGS. 16-18, there is illustrated an adaptor 314 having a rim portion 316 and an arcuate tongue portion 318 which extends to one side of the rim portion 316. A lug 322 protrudes from the back of the tongue portion 318 which is adapted to be accepted by the center hole 234 provided in the face plate 234 (FIG. 11). The rim portion 316 includes a pair of tab portions 320 which are positionable through the slots 276 provided in the base section 264 of the U-shaped bracket 242 to secure the adaptor 314 within the interior of the bracket 242. With the tab portions 320 of the adaptor 314 positioned within the bracket 242 in this manner, the conduit end 38 can be inserted endwise into the resultant spacing provided between the interior of the bracket 242 and the tongue portion 318 (a shown in FIG. 17) and into abutting relationship with the rim portion 316.

With the conduit end 42 positioned within the bracket 242 in this manner, the tongue portion 318 is held in position within the interior of the conduit 42. Therefore, when load-induced forces which tend to torque the conduit 42 about the conduit-engaging assembly 200 as aforedescribed, the tongue portion 318 is in position to act as an abutment surface which opposes the aforedescribed torquing of the interior surface of the conduit 42 during a wire or rope-pulling operation. Thus, the adaptor 314 further opposes load-inducing forces which tend to torque the clamped conduit 42 about the conduit-engaging assembly 200 and is advantageous in this respect.

Further still and as shown in FIG. 16, the adaptor 214 is open along one side thereof (i.e. along the side thereof opposite the tongue portion 318). This open side of the adaptor 214 permits the adaptor 214 to be readily positioned about a wire or rope being pulled as the adaptor 214 is manipulated sideways onto the wire or rope. Similarly, the open side of the adaptor 214 adaptor accommodates the removal of the adaptor 214 from a position about the wire or rope being pulled from the conduit 42. The advantage of this feature can be readily appreciated if, for example, it is desired to remove the adaptor 214 from its position about a wire or rope during the course of a wire or rope-pulling operation.

Inasmuch as the conduit 42 through which a wire or rope is desired to be pulled can be of a number of different sizes (i.e. diameters), it will be understood that the bracket 214 and the adaptor 214 can be appropriately sized to more closely correspond to the size of a differently-sized conduit for pulling a wire or rope through the conduit. In this regard, there are mounted upon the wheeled base 22 a plurality of adaptors 324 (FIG. 1) which have been sized to cooperatively interfit with conduits of different size. By mounting these adaptors 324 upon the wheeled base 22, the adaptors 324 remain in close proximity to an operator who uses the puller 20.

It follows from the foregoing that a wire puller 20 has been described which is capable of pulling a length 46 of wire or rope through a conduit 42 at a jobsite. In addition, the provision of two capstans 34 and 36 provides an operator with the option of utilizing one capstan 36 for higher-speed, lower-load pulls or the other capstan 34 for lower-speed, higher-load pulls and further provides the operator with the capacity of readily switching (during one pull) the wire or rope being pulled from one capstan 34 to the other capstan 36, or vise-versa. Thus, the puller 20 enables an operator to effect any of a number of different types of wire or rope pulls in a cost effective manner and with a single piece of equipment.

A puller 20 in accordance with the aforedescribed structure has been constructed and found to possess the capacity to apply about 10,000 pounds of pull to a wire or rope routed through a conduit 42.

It will be understood that numerous modifications and substitutions can be had to the aforedescribed embodiment 20 without departing from the spirit of the invention. Accordingly, the aforedescribed embodiment 20 is intended for the purpose of illustration and not as limitation.

The invention claimed is:

1. A puller device for pulling a wire or rope through a conduit, said device comprising:
   a frame adapted to rest upon an underlying floor and having two opposite sides;
   an elongated arm arrangement which is connected at one end to the frame and has an opposite end which is positionable adjacent the conduit through which the wire or rope is to be pulled and along which the wire or rope travels as the wire or rope is pulled from the conduit; and
   first and second motor-driven capstans which are rotatably mounted upon the frame so as to extend from the two opposite sides of the frame and wherein each capstan is mounted for rotation with respect to the frame about a rotation axis which is substantially parallel to the underlying floor, and each having a rotatable surface about which a wire or rope can be wound for wire or rope-pulling purposes so that by winding the wire or rope about either the first or second capstan and actuating the motor-driven capstan about which the wire or rope is wound, the wire or rope is pulled through the conduit as the first or second capstan about which the wire or rope is wound is rotated relative to the frame.

2. The device as defined in claim 1 wherein the rotatable surface of the first capstan possesses a diameter, and the rotatable surface of the second capstan possesses a diameter which is smaller from that of the first capstan enabling an operator to selectively wind the wire or rope being pulled about either the first capstan for higher-speed pulling operations requiring relatively low load requirements or the second capstan for lower-speed pulling operations requiring relatively higher load requirements.

3. The device as defined in claim 1 wherein the elongated arm arrangement includes:
   a) a first elongated arm member having a proximal end portion which is joined to the frame and a distal end portion;
   b) a second elongated arm member having a proximal end portion which is joined to the distal end portion of the first elongated arm member at a corner and a distal end portion
   so that the wire or rope being pulled through the conduit and moves toward the first or second capstan travels, in sequence, along the second elongated arm member, about said corner and then along the first elongated arm member; and
   the device further includes a plurality of rollers which are mounted for rotation adjacent said corner and have surfaces which collectively provide a guideway along which the wire or rope is permitted to move as the wire or rope travels about said corner.

4. The device as defined in claim 3 further comprising a pair of plates which are arranged in spaced and parallel relationship with one another and which are fixedly secured to one of the first or second elongated arm member adjacent said corner, the rollers are rotatably mounted between the pair of plates, and the guideway which is provided by the surfaces of the rollers is substantially arcuate in shape so that load-induced forces which bear against the rollers during a wire or rope-pulling operation are distributed between the rollers.

5. The device as defined in claim 1 further comprising a conduit-engaging assembly mounted at the opposite end of the elongated arm arrangement for holding the conduit in a fixed relationship with respect to the elongated arm arrangement during a wire or rope-pulling operation.

6. The device as defined in claim 5 wherein the conduit-engaging assembly includes a U-shaped bracket having an interior which is positionable about the conduit through which the wire or rope is to be pulled and hardware which provides an abutment surface against which the conduit is positionable so that when the conduit is held by the conduit-engaging assembly, the conduit is positioned between the abutment surface and the interior of the U-shaped bracket.

7. The device as defined in claim 6 wherein the conduit through which the wire or rope is desired to be pulled includes an end, a shoulder which is spaced from the conduit end and a reduced portion which extends between the shoulder and the conduit end; and
   the U-shaped bracket includes a base section including a thickened region along the interior surface thereof and a lip portion so that when the conduit is held in a fixed relationship by the conduit-engaging assembly, the thickened region engages the reduced portion of the conduit and the lip portion abuts the shoulder of the conduit.

8. The device as defines in claim 6 further comprising an adaptor which is connectable between the hardware and the U-shaped bracket and which includes a tongue portion which is positionable within the interior of the conduit when the conduit is held by the conduit-engaging assembly for bearing against the interior of the conduit during a wire or rope-pulling operation to counter load-induced torquing forces exerted upon the conduit during a wire or rope-pulling operation.

9. The device as defined in claim 8 wherein the adaptor is open along one side thereof to accommodate the positioning of the adaptor about the wire or rope being pulled from the conduit or to accommodate the removal of the adaptor from a position about the wire or rope being pulled from the conduit.

10. The device as defined in claim 1 further comprising a wheeled base for rollably supporting the frame upon the underlying floor, the wheeled base including two wheels which are aligned with one another for rotation about a single rotation axis and which permit the frame to be pivoted relative to the underlying floor about the single rotation axis.

11. The device as defined in claim 10 wherein the frame is connected to the wheeled base in a manner which permits the positional relationship relative to the wheeled base to be adjusted to thereby alter the center of gravity of the device relative to the single rotation axis.

12. The device as defined in claim 11 wherein the frame is adapted to be slidably moved relative to the wheeled base along a pathway which is substantially normal to the single rotation axis.

13. A puller device for pulling wire or rope from the end of a conduit, said puller device comprising:
   a frame adapted to rest upon an underlying floor and having two opposite sides;
   first and second capstans mounted upon the frame so as to extend from the two opposite sides of the frame and wherein each capstan is mounted for rotation with respect to the frame about a rotation axis which is substantially parallel to the underlying floor and has a rotatable surface about which a wire or rope can be wrapped so that upon rotation of the capstan about which the wire or rope is wrapped, the wire or rope is pulled from the end of the conduit;
   an elongated arm arrangement having one end which is mounted upon the frame and another end which is positionable adjacent the end of the conduit, the elongated arm arrangement including first and second elongated arm members along which the wire or rope is permitted to travel during a wire or rope-pulling operation wherein the wire or rope travels along the second elongated arm member and then along the first elongated arm member as the wire or rope is pulled toward the capstan; and means for connecting the first and second elongated arm members together for movement about a pivot axis, and the connecting means includes a plurality of rollers having surfaces along which the wire or rope bears against during a wire or rope-pulling operation so that forces which are exerted upon the connecting means by the wire or rope are distributed between the rollers; and a motor which is mounted upon the frame and is drivingly connected to the first and second capstans so that actuation of the motor effects the rotation of the first and second capstans simultaneously; and wherein the rotatable surface of the first capstan possesses a diameter, and the rotatable surface of the second capstan possesses a diameter which is smaller from that of the first capstan enabling an operator to selectively wrap the wire or rope being pulled about the first capstan having a rotatable surface of larger diameter for higher-speed pulling operations requiring relatively low load requirements or the second capstan having a rotatable surface of smaller diameter for lower-speed pulling operations requiring relatively higher load requirements so that in any pulling operation performed with the device, the wire or rope can be wrapped about either the first capstan or the second capstan depending upon the load requirements of the motor necessary to pull the wire or rope through the conduit.

14. The device as defined in claim 13 wherein the plurality of rollers are mounted for rotation about axes which are substantially parallel to one another, and the rollers collectively provide an arcuate path along which the wire or rope is moved as the wire or rope travels along the second elongated arm member and then along the first elongated arm member.

15. The device as defined in claim 13 further comprising a conduit-engaging assembly mounted at the opposite end of the elongated arm arrangement for holding the conduit in a fixed relationship with respect to the elongated arm arrangement during a wire or rope-pulling operation.

16. The device as defined in claim 15 wherein the conduit-engaging assembly includes a U-shaped bracket having an interior which is positionable about the conduit through which the wire or rope is to be pulled and hardware which provides an abutment surface against which the conduit is positionable so that when the conduit is held by the conduit-engaging assembly, the conduit is positioned between the abutment surface and the interior of the U-shaped bracket.

17. The device as defined in claim 16 wherein the conduit through which the wire or rope is desired to be pulled includes an end, a shoulder which is spaced from the conduit end, and a reduced portion which extends between the shoulder and the conduit end; and the U-shaped bracket includes a base section including a thickened region along the interior surface thereof and a lip portion so that when the conduit is held in a fixed relationship by the conduit-engaging assembly, the thickened region engages the reduced portion of the conduit and the lip portion abuts the shoulder of the conduit.

18. The device as defined in claim 15 further comprising a wheeled base for rollably supporting the frame upon the underlying floor, the wheeled base including two wheels which are aligned with one another for rotation about a single rotation axis and which permit the frame to be pivoted relative to the underlying floor about the single rotation axis.

19. The device as defined in claim 15 including two motor-driven capstans mounted upon the frame for rotation with respect thereto, and each capstan having a rotatable surface about which a wire or rope can be wrapped so that upon rotation of the capstan about which the wire or rope is wrapped, the wire or rope is pulled from the end of the conduit.

20. A puller device for pulling a wire or rope through an opening defined in a conduit having an end wherein the conduit includes a cylindrical portion adjacent the conduit end and having outer sidewalls which encircle the conduit opening and wherein the conduit has a longitudinal axis, said device comprising:

a frame;

at least one motor-driven capstan mounted upon the frame for rotation with respect thereto and having a rotatable surface about which a wire or rope can be wrapped so that upon rotation of the capstan, the wire or rope is pulled from the end of the conduit;

an elongated arm arrangement having one end which is mounted upon the frame and an opposite end which is positionable adjacent the opening of the conduit, and the elongated arm arrangement includes an elongated portion disposed adjacent the opposite end of the elongated arm arrangement wherein the elongated portion includes a longitudinal axis; and a conduit-engaging assembly mounted at the opposite end of the elongated arm arrangement for holding the conduit in a fixed positional relationship with respect to the elongated arm arrangement during a wire or rope-pulling operation so that the longitudinal axis of the conduit is maintained by the conduit-engaging assembly in a fixed positional relationship with respect to the longitudinal axis of the elongated portion of the elongated arm arrangement and wherein the conduit-engaging assembly includes a U-shaped bracket having an interior which is positionable about the cylindrical portion of the conduit defining the opening through which the wire or rope is to be pulled and hardware which provides an abutment surface against which the conduit is positionable so that when the conduit is held by the conduit-engaging assembly, the cylindrical portion of the conduit is positioned between the abutment surface and the interior of the U-shaped bracket so that the abutment surface engages the outer sidewalls of the conduit on one side of the opening and so that the interior of the U-shaped bracket engages the outer sidewalls of the conduit on a side thereof which is substantially opposite said one side so that the conduit-engaginq assembly and the conduit are joined as an inflexible unitary structure to prevent the conduit-engaging assembly from being pivoted relative to the longitudinal axis of the conduit during a wire or rope-pulling operation and thereby prevent the longitudinal axis of the elongated arm arrangement from being pivoted relative to the longitudinal axis of the longitudinal axis of the conduit during a wire or rope-pulling operation.

21. The device as defined in claim 20 wherein the conduit through which the wire or rope is desired to be pulled includes a shoulder which is spaced from the conduit end, and a reduced portion which extends between the shoulder and the conduit end; and the U-shaped bracket includes a base section including a thickened region along the interior surface thereof and a lip portion so that when the conduit is held in a fixed relationship by the conduit-engaging assembly, the thickened region engages the reduced portion of the conduit and the lip portion abuts the shoulder of the conduit.

22. The device as defines in claim 21 further comprising an adaptor which is connectable between the hardware and the U-shaped bracket and which includes a tongue portion which is positionable within the interior of the conduit when the conduit is held by the conduit-engaging assembly for bearing against the interior of the conduit during a wire or rope-pulling operation to counter load-induced torquing forces exerted upon the conduit during a wire or rope-pulling operation.

23. The device as defined in claim 22 wherein the adaptor is open along one side thereof to accommodate the positioning of the adaptor about the wire or rope being pulled from the conduit or to accommodate the removal of the adaptor from a position about the wire or rope being pulled from the conduit.

24. The device as defined in claim 20 further comprising a wheeled base for rollably supporting the frame upon an underlying floor, the wheeled base including two wheels which are aligned with one another for rotation about a single rotation axis and which permit the frame to be pivoted relative to the underlying floor about the single rotation axis.

25. The device as defined in claim 20 including two motor-driven capstans mounted upon the frame for rotation with respect thereto, and each capstan having a rotatable surface about which a wire or rope can be wrapped so that upon rotation of the capstan about which the wire or rope is wrapped, the wire or rope is pulled from the end of the conduit.

* * * * *